United States Patent [19]

Ollero Pina et al.

[11] Patent Number: 4,663,174
[45] Date of Patent: May 5, 1987

[54] METHOD OF STUFFING PITTED OLIVES WITH ANCHOVIES

[75] Inventors: Juan Carlos Ollero Pina; Engracia Gonzalez Centeno; Manuel Varela Fuentes, all of Seville, Spain

[73] Assignee: Sociedad Anonima de Racionalizacion & Mecanizacion (SADRYM), Seville, Spain

[21] Appl. No.: 726,229

[22] Filed: Apr. 23, 1985

[30] Foreign Application Priority Data

Nov. 21, 1984 [ES] Spain .................................. 537819

[51] Int. Cl.$^4$ ......................... A23B 7/00; A23L 1/04
[52] U.S. Cl. ................................... 426/282; 426/102; 426/402; 426/407
[58] Field of Search ............... 426/282, 643, 455, 576, 426/92, 102, 402, 407

[56] References Cited

U.S. PATENT DOCUMENTS

| 2,536,708 | 1/1951 | Angermeier | 99/131 |
| 3,362,381 | 1/1968 | Farrell | 119/1 |
| 3,367,783 | 2/1968 | Billerbeck | 426/573 |
| 3,892,870 | 7/1975 | Wood | 99/131 |
| 3,932,673 | 1/1976 | Webster | 99/450.1 |
| 3,962,474 | 6/1976 | Smith | 426/282 |
| 4,006,256 | 2/1977 | Kyros | 426/282 |
| 4,141,287 | 2/1979 | Becker et al. | 426/282 |

OTHER PUBLICATIONS

Woodroof et al., "Olives", Commercial Fruit Processing published by the AVI Publishing Company, Inc., pp. 204-217 (1975).

Primary Examiner—George Yeung
Attorney, Agent, or Firm—Cushman, Darby & Cushman

[57] ABSTRACT

Incoming batches of olives crudely packed in brine are subjected to a homogenization process in respect to their initial brine content, by replacing the brine with fresh brine until the olives have a waste lye value less than 0.05N and a pH of about 3.8. These olives are pitted leaving an open cavity and the removed plugs are saved. A stuffing of anchovy meat, tuna-fish or pepper mixed with a texturizing agent such as an aqueous solution of sodium aliginate is prepared and the olives are stuffed with it. The stuffing has an aqueous solution of calcium chloride dripped on it to gel its surface and the filled cavities are closed with the saved plugs of olive. The stuffed olives are packed into containers, macerating fluid is added and the contained olives packed in macerating fluid are thermically pasturized to sanitize and stabilize them.

11 Claims, 3 Drawing Figures

METHOD OF STUFFING PITTED OLIVES WITH ANCHOVIES

BACKGROUND OF THE INVENTION

The present invention, as follows from the title of this detailed description, relates to a method of stuffing with anchovies, that is to say, a method of stuffing the hole of a pitted olive with an anchovy, said method also being applicable for stuffing an olive with dough of boiled tuna-fish, with pepper or with other type of stuffing.

As it is well known, the process of pitting olives so that they may then be stuffed with anchovies constitutes a normal practice for such products from time immemorial.

Furthermore, as it is obvious, independently of the process of pitting olives, a certain treatment is imperative, particularly when anchovies are employed as stuffing matter, in order that such stuffing may be used with full guarantee that optimum organoleptic characteristics and microbiological stability of the finished product will be obtained.

The usual and most commonly employed process of handling anchovies, prior to their introduction inside the olives, incorporates a first stage in which anchovies are washed with water so that they may be desalted, a second stage in which the anchovies are filleted, that is to say, their fishbones and tails are removed, this operation being performed manually, and a third stage in which the soft portions of the anchovy are placed inside cylindrical cartridges where, thanks to the cooperation of a pneumatic or a hydraulic plunger, the extrusion of the product occurs, which product adopts the form of a dough.

This dough is supplied to a pitting and stuffing machine in which, thanks to a number of different mechanical means, pits of olives are being removed, the dough is then placed inside the olives and, finally, the inlet leading to the empty interior of the olive will be closed by the very piece of olive which was cut earlier on in the pitting stage.

Last of all, the stuffed olives are placed inside suitable containers, usually tins or cans, which also contain brine incorporating a certain type of preservatives designed to preserve the goods up to the very moment of their consumption.

There are many and important problems derived from the conventional methods of stuffing with anchovies.

In the first place, the fact that the filletting stage is achieved manually involves high costs, mainly due to the aforesaid labour force, and this circumstance further determines a tendency to speed up this manual process in order to reduce such a cost, in a manner such that the removal of fishbones and tails is carried out in a fast and careless manner, this being detrimental to the quality of the product. Now then, if we attempt to eliminate this operating stage with a view to avoiding the high costs involved, the loss in the quality of the product is so marked that it will surely be substantially less popular in the market.

A second but equally important problem derived from such conventional methods relates to the stage of preparation of the stuffing matter, namely, dough of anchovy.

In this sense, we have ascertained that the pressure needed for an anchovy to be transformed into a dough, combined with the tension between layers related to the extrusion, alter the fibrous structure of the muscle of the fish, thus causing the release of fats contained therein and facilitating its disgregation in the consecutive stages of the process, especially at that point in time when the already stuffed olive is submerged in the macerating fluid, that is to say, the fluid or liquid which jointly with the olives occupy the available capacity of the can or tin, causing the fluid to get muddy and, in some cases, causing the olives to be emptied out.

Obviously, all of this results in a poor and hardly pleasant presentation, as well as a remarkable misuse of the product, at the time of its consumption.

In this sense, it is also worth mentioning that the aforesaid disgregation problem may even get worse, to the point of disgregating very rapidly and almost totally, if a pasteurization stage, i.e. thermical treatment commonly employed in several industries, was applied as a means of sanitization and stabilization for the product.

The above problems bring about derivative problems, given that the impossibility to apply thermical treatments for the stabilization of the product forces manufacturers to employ specific preservatives of doubtful efficacy, such as the benzolic acid, or preservatives prohibited by the majority of the Food Legislations, such as the salicylic acid. This last stabilization process may well hide a bad manufacturing practice and/or be directly hazardous to public health, especially to the health of people suffering from renal disease.

SUMMARY OF THE INVENTION

The method proposed in the present invention has been conceived specifically to solve, in a fully satisfactory manner, all the problems existing with the conventional methods in all and each of their different modalities.

Expressed in more concrete terms, the method of stuffing with anchovies as proposed in the present invention basically comprises six operating stages as follows:

Stage of preparation of the olive to be stuffed.
Stage of preparation of the anchovy.
Stage of stuffing the olive with the anchovy.
Stage of packing the previously stuffed olive.
Stage of preparation of the macerating fluid.
Stage of sanitization and stabilization.

All of these operating stages, although broadly conventional in themselves, present specific characteristics upon which the invention is precisely based and which provide the claimed method with the special features required to solve all and each of the problems presented by the aforementioned conventional technique.

DETAILED DESCRIPTION OF THE IVENTION

Figure 1:
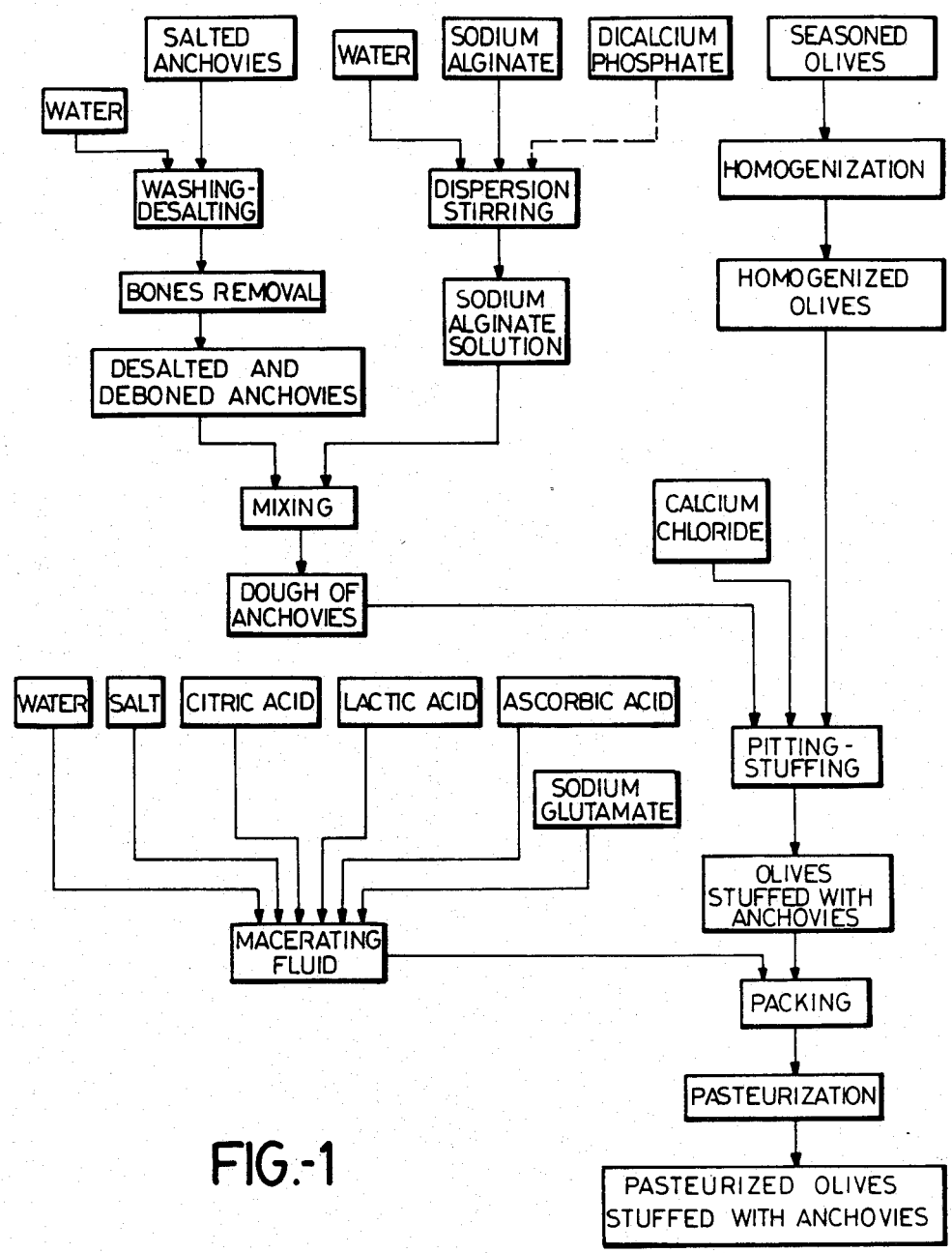
FIG. 1 is a diagrammatic flow sheet illustrating the process of a first embodiment of the invention.

The following description has reference to the first embodiment, which is illustrated in FIG. 1.

With regard to the first operating stage, i.e. the one in which the olive is being prepared, it is well known that, as a consequence of the alkaline treatment to which the green olive is subjected, prior to the fermentation process, to the object of eliminating the strong bitterness which is peculiar to this fruit, the seasoned olive contains a certain amount of sodic salts of organic acids, mainly lactates, which act blocking the brines and, consequently, forcing the addition of greater amounts of acid than theoretically required to reach a determined PH.

In order to obtain a balanced taste in the olive stuffed with anchovy, a balance between acidity and salinity, we mean, it is necessary that the buffer capacity of the olive be reduced and that the salinity and acidity levels be maintained within restricted limits.

To that effect, there has been anticipated, and this constitutes one of the key features of the method claimed, the homogenization of the olives as a preliminary step.

In more concrete terms, the homogenization and reduction of the buffer capacity is carried out replacing the brines of the olives themselves, which brines may vary depending on the origin of the different consignments of olives, by fresh brines provided with a grading suitable to eliminate the differences existing between the different consignments of olives. This operation may be carried out as many times as will be necessary to leave the "waste lye" (in the olives) under a 0.05 N value, there being provided a preferred PH value of 3.8 at the end of this first operating stage.

In regard to the second operating stage, that of preparing the achovy with which the olive will be stuffed, said preparation starts with the usual washing operation. In more concrete terms, the fish, which offers a suitable ripening degree, is subjected, with the aid of showers, to the action of water in order to eliminate the particles of salt that might still be adhered to the body of the fish following its extraction from the container in which the ripening took place. In the course of this same washing operation, there is obtained the elimination of those fats that may have not been removed from the anchovy throughout the ripening process.

Hard parts, namely, fishbones, spines, tails and scales, are removed from the washed anchovy. This operation, which is likewise conventional in itself, offers the pecularity of having eliminated the traditional manual process, thus avoiding the costs and disadvantages derived therefrom.

According to a further characteristic of the invention, the removal of the hard parts of the fish is carried out through screening or sieving thereof, with the consequence of simultaneously filleting and transforming the fish into a dough of anchovy.

At this stage, the screening operation is carried out by supplying a slight pressure to the anchovy by means of an elastic band of adequate consistency which runs at low speed clasping a round sieve of a suitable calibre, giving way to progressively smaller spaces situated between the band and the sieve, inside which spaces the fish, which always present the major surface of their hard parts facing the sieve, may be housed.

The round sieve also rotates at low speed, even slightly lower than the speed of the band itself, thereby causing the loosening of the muscle of the fish simultaneously to the supply of pressure to the fish. The pressing and loosening actions imply a further move of the flesh of anchovy inside the round sieve during the time it is in contact with said sieve, while on the feeding side of the sieve are kept the aforementioned hard and consequently disposable parts, namely, fishbones, spines, tails and scales. During this operating stage, although the fish logically loses its typical form, the resulting dough preserves most of the fibrous nature of the original muscle, which implies a partial maintenance of its structure and helps prevent its disgregation in the successive stages of the method, in contrast to the traditional method of stuffing with anchovies.

However, as a complement to the anti-disgregating effects achieved through the sieving operation, itself, there has been envisaged to strengthen the cohesion of the dough of anchovy, this being a further characteristic of the invention, by adding to the dough obtained on the previous stage a water solution of a texturizing agent, such as sodium alginate, closely mixing the ingredients of the solution through a suitable process, for example, the soft and continued stirring of the solution inside a container.

The amount of solution required to achieve the end sought, i.e., the strengthening of the cohesion of the anchovy dough, may vary between 30% and 70% of the mixture, whilst the percentage of sodium alginate required to obtain the solution may vary between 0.1% and 5%, depending on the specific texture which we wish to obtain.

However, according to a preferred example of practical construction, the solution will be obtained with 5% alginate and 95% water, which solution, once it has been obtained, should be mixed on a fifty-fifty basis with a dough of anchovy, that is to say, under conditions such that the percentage of the solution will coincide with the percentage of the filleted achovy.

The next operating stage relates to the practical introduction of the anchovy stuffing inside the olive, which operation may be carried out with the aid of any suitable process or device.

Specifically, at the end of the stuffing process, when the dough of anchovy is placed inside the olive and prior to the definitive positioning of the previously cut piece of olive back on the olive, a solution of calcium chloride is applied on the dough of anchovy, preferably with the cooperation of an adjustable dripping device, in a manner such that the said product will cause the gelification of the outer surface of the anchovy dough, thus generating a thin capsule that encloses the dough and further supplies same with the definitive consistency required so that it will not by any means disperse in the brine or macerating fluid.

This operating stage can also be performed through a process of internal gelification instead of the abovementioned process of molecular diffusion of the calcium supplied externally. To that effect, we must employ a calcium salt, insoluble with a neutral PH but soluble in an acid environment, very thinly spread upon the dough of anchovy and that will turn slowly soluble when in contact with the interior acid walls of the olive and subsequently with the acidulated brine, causing the sodium alginate to gelify.

In accordance with a preferred example of practical achievement, the solution will be obtained on the basis of 5% sodium alginate, 1% dicalcium phosphate dehidrate and 94% water, and, as soon as the solution has been obtained, with the phosphate in homogeneous and slight dispersion, it will be mixed on a fifty-fifty basis with dough of anchovy, that is to say, under conditions such that the percentage of the solution will coincide with the percentage of the filleted dough of anchovy. Thanks to this operating stage, which, as set out before, constitutes one of the special features of the invention, it is feasible to apply the thermical pasteurization treatment needed for the sanitization and preservation of the product. A thermical treatment like this, as set out above, is not feasible with the conventional methods of stuffing with anchovies.

The next operating stage, the one in which the product is packed, consists of placing the olives stuffed with anchovies inside tins or glass flasks with the aid of conventional procedures and controls, adding to said containers the macerating fluid which is nothing other than a simple brine deprived of any type of preservative, given that, as it has been stated above, the sanitization and stabilization of the finished product, once the classical disgregation problems are solved, will be carried out through a pasteurization process.

From what has been explained above follows that the sanitization and stabilization operating stage takes place next and not prior to the packing stage, since it is intended to eliminate the vegetative forms of microorganisms capable of developing under the typical physicochemical conditions of the olives stuffed with anchovies, which elimination will be of maximum efficacy if carried out through a thermical treatment that will not affect the typical organoleptic properties of the product.

In more concrete terms, we have considered that the more thermo-resistant microorganisms are the propionic bacteria and, thanks to their own TDT and the heat penetration curves of the different type of containers that may be used, we will be above to determine the amount of time required for the pasteurization process at the most convenient temperature, previously selected.

As stated above, a treatment like this can only be applied as a consequence of the previous preparation to which the dough of anchovy has been subjected and produces the effect of fully stopping the enzymatic process, which has been operative during the previous stuffing stages and which continues to operate when the preservatives contemplated in the conventional methods are used, thus increasing the buffer effect, mullifying the acidulating power of the preservatives and making the PH go up, all of which clears the path for the action of the microbial agents which may spoil the canned goods.

Figure 2:
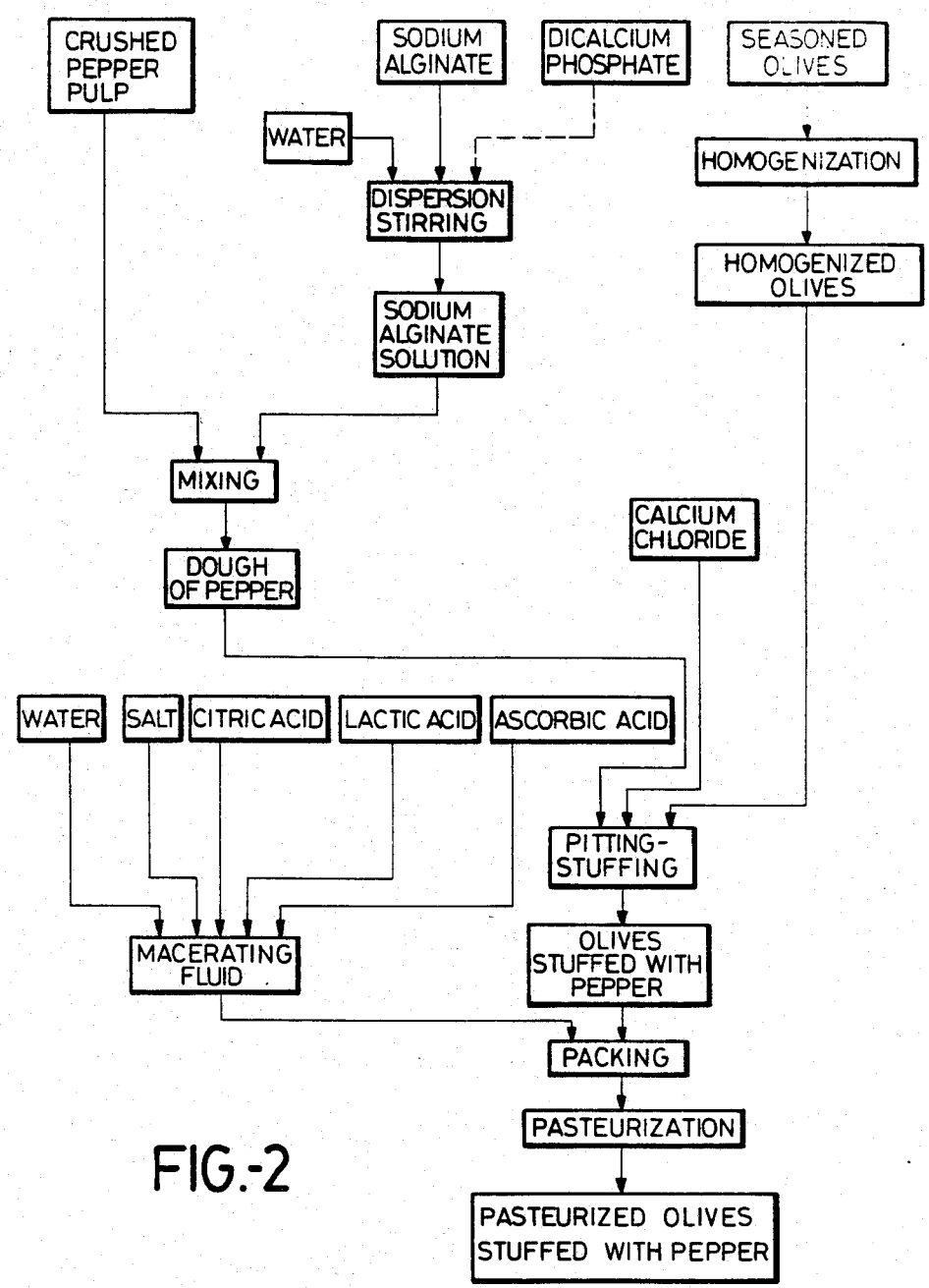
FIG. 2 is a diagrammatic flow sheet illustrating the process of a second embodiment of the invention.
Figure 3:
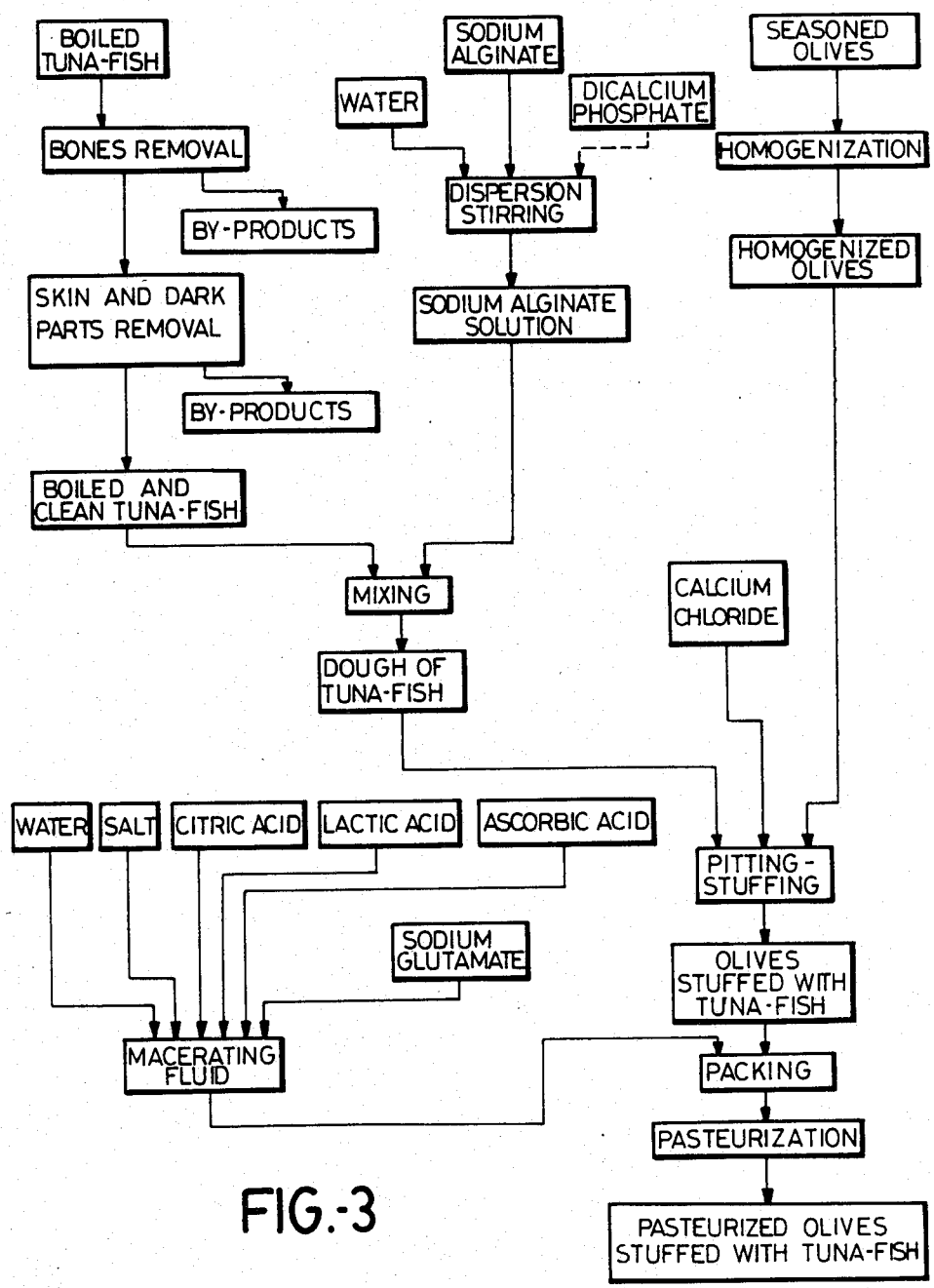
FIG. 3 is a diagrammatic flow sheet illustrating the process of a third embodiment of the invention.

Now having reference to FIGS. 2 and 3, differences of the second and third embodiments of the invention from the first will be described.

Although the present description is based on the stuffing of olives with anchovies, the method described is likewise basically applicable for stuffing olives with tuna-fish, with pepper or with other type of stuffing.

The only difference is that in the last two cases the filleting stage disappears, for the pepper lacks hard parts, and the same applies to the tuna-fish, as we will use filleted and boiled tuna-fish, keeping the rest of the method intact and simply changing the parameters employed for obtaining the stuffing-solution mixture.

In more concrete terms, while with respect to the boiled tuna-fish and the pepper the solution of alginate in water may be maintained in proportions ranging from 1% of 5% alginate and 95% to 99% water, when it comes to obtaining the definitive dough of product-solution mixture, while in the case of the anchovy the preferred magnitudes of the two elements will be equal, 50% dough of anchovy and 50% solution, when the dough used is either tuna-fish or pepper the corresponding proportions are 60% to 80% dough and 20% to 40% solution. In other words, the preferred values chosen for the tuna-fish and the pepper are 5%, 95%, 75% and 25% respectively, which values may go up or down depending on the practical requirements in each case.

It is not considered necessary to enlarge on this description to permit a person skilled in the art to fully understand the scope of the invention and the advantages derived therefrom.

We claim:
1. In a process for preparing a stuffed olive in which:
   (a) an olive having an initial brine content is prepared for stuffing including providing an open cavity therein;
   (b) a quantum of a desired stuffing is prepared;
   (c) said quantum of said desired stuffing is stuffed into said cavity;
   (d) the resultingly stuffed olive is packed into a container;
   (e) a liquid macerating fluid is filled into the container so as to bathe the stuffed olive therein;
   (f) the contained stuffed olive in macerating fluid is sanitized and stabilized;
   the improvement wherein:
   as a part of preliminary step (a), said olive is homogenized as to said initial brine content thereof by replacing such brine with fresh brine such as to produce in said olive prepared for stuffing a waste lye value less than 0.05N and a pH of about 3.8.

2. The improved process of claim 1, wherein:
   as a part of conducting step (b), an anchovy is mechanically separated into hard parts including bones and soft parts including muscle by passing the anchovy between a presser and a sieve while using the presser to lightly press the anchovy against the sieve such as to push the hard parts but not the soft parts of the anchovy through the sieve, and collecting the soft parts of the anchovy from the sieve to provide said quantum of desired stuffing.

3. The improved process of claim 2, further comprising:
   adding an aqueous solution of a texturizing agent to said collected soft parts of the anchovy and mixing this solution and anchovy and texturizing agent together to provide a texturizing agent and anchovy mixture.

4. The improved process of claim 3, wherein:
   said aqueous solution is a 0.1–5.0 percent solution by weight of sodium alginate and said aqueous solution constitutes from 30 to 70 percent by weight of the texturizing agent/anchovy mixture.

5. The improved process of claim 4, wherein:
   said aqueous solution is a 5.0 percent by weight solution of sodium alginate and said aqueous solution constitutes 50 percent by weight of the texturing agent and anchovy mixture.

6. The improved process of claim 1, wherein:
   as a part of conducting step (b) a quantity of tuna-fish is mixed with a quantity of an aqueous solution of texturizing agent to provide a texturizing agent and tuna-fish mixture.

7. The improved process of claim 6, wherein:
   said aqueous solution is a 0.1–5.0 percent solution by weight of sodium alginate and said aqueous solution constitutes from 20 to 40 percent by weight of said texturizing agent and tuna-fish mixture.

8. The improved process of claim 1, wherein:
between conducting steps (c) and (d) the following further steps are conducted:
an aqueous solution of calcium chloride is applied to said quantum for effecting gelification of the outer surface of said quantum in order to reduce dispersion thereof in said macerating fluid.

9. The improved process of claim 8, wherein:
said aqueous solution of calcium chloride is applied to said quantum by dripping.

10. The improved process of claim 8, wherein:
between the aqueous calcium-chloride solution applying step and conducting step (d), said open cavity which has been stuffed with said quantum is closed by stopping it with a plug of olive.

11. The improved process of claim 1, wherein:
in conducting step (f), the contained stuffed olive in macerating fluid is subjected to thermic pasturization.

* * * * *